United States Patent
Liu

(10) Patent No.: US 12,114,275 B2
(45) Date of Patent: Oct. 8, 2024

(54) SYNCHRONIZATION SIGNAL/PBCH BLOCK TRANSMISSION METHOD, RECEIVING METHOD, APPARATUS, DEVICE, AND MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 347 days.

(21) Appl. No.: 17/629,749

(22) PCT Filed: Jul. 25, 2019

(86) PCT No.: PCT/CN2019/097681
§ 371 (c)(1),
(2) Date: Jan. 24, 2022

(87) PCT Pub. No.: WO2021/012255
PCT Pub. Date: Jan. 28, 2021

(65) Prior Publication Data
US 2022/0264495 A1     Aug. 18, 2022

(51) Int. Cl.
*H04W 56/00* (2009.01)
*H04W 72/0446* (2023.01)
*H04W 74/00* (2009.01)
*H04W 74/08* (2009.01)
*H04W 74/0816* (2024.01)

(52) U.S. Cl.
CPC ..... *H04W 56/001* (2013.01); *H04W 72/0446* (2013.01); *H04W 74/006* (2013.01); *H04W 74/0816* (2013.01); *H04W 74/0866* (2013.01)

(58) Field of Classification Search
CPC ........... H04W 56/001; H04W 72/0446; H04W 74/006; H04W 74/0808; H04W 74/0816; H04W 74/0866
See application file for complete search history.

(56) References Cited

U.S. PATENT DOCUMENTS

| 2019/0037509 A1 | 1/2019 | Li et al. |
| 2019/0191457 A1* | 6/2019 | Si .................. H04L 5/0082 |
| 2019/0200307 A1 | 6/2019 | Si et al. |
| 2020/0244530 A1* | 7/2020 | Lin ................. H04W 72/23 |
| 2020/0344811 A1* | 10/2020 | Ren ................. H04W 72/0446 |

(Continued)

FOREIGN PATENT DOCUMENTS

| CN | 108521887 A | 9/2018 |
| CN | 109041199 A | 12/2018 |
| WO | 2018236671 A1 | 12/2018 |

OTHER PUBLICATIONS

International Search Report of PCT Application No. PCT/CN2019/097681 dated Apr. 23, 2020 with English translation, (7p).

(Continued)

*Primary Examiner* — Gary Mui
(74) *Attorney, Agent, or Firm* — Arch & Lake LLP

(57) ABSTRACT

A synchronization signal/PBCH block (SSB) transmission method. The method includes: transmitting, in two continuous slots, four synchronization signal/PBCH blocks (SSBs) and remaining minimum system information (RMSI) corresponding to the four SSBs respectively.

17 Claims, 9 Drawing Sheets

(56) References Cited

U.S. PATENT DOCUMENTS

| | | | |
|---|---|---|---|
| 2021/0212006 A1* | 7/2021 | Liu | H04L 1/1642 |
| 2022/0007312 A1* | 1/2022 | Liu | H04W 56/001 |
| 2022/0086776 A1* | 3/2022 | Li | H04W 56/001 |
| 2022/0095118 A1* | 3/2022 | Harada | H04L 5/0044 |
| 2022/0141780 A1* | 5/2022 | Harada | H04W 56/0015 |
| | | | 370/503 |
| 2022/0150800 A1* | 5/2022 | Harada | H04L 5/0053 |
| 2022/0256487 A1* | 8/2022 | Liu | H04W 56/001 |
| 2022/0272681 A1* | 8/2022 | Harada | H04W 48/12 |

OTHER PUBLICATIONS

Vivo, "Discussion on the Channel Access Procedures" 3GPP TSG RAN WG1 Meeting #95 R1-1812300, Spokane, WA, Nov. 16, 2018, (7p).

Nokia et al.,"Initial Access Signals and Channels for NR-U" 3GPP TSG RAN WG1 Meeting #96bis R1-1904192, Xi'an, China, Apr. 12, 2019, (24p).

First Office Action of Chinese Application No. 201980001493.1 dated Sep. 9, 2022 with English translation, (12).

\* cited by examiner

Coreset #0 corresponding to SSB 0/SSB 1
Coreset #0 corresponding to SSB 2/SSB 3

SYNCHRONIZATION SIGNAL/PBCH BLOCK TRANSMISSION METHOD, RECEIVING METHOD, APPARATUS, DEVICE, AND MEDIUM

CROSS-REFERENCE TO RELATED APPLICATION

This application is a U.S. National Phase of International Patent Application Serial No. PCT/CN2019/097681, filed on Jul. 25, 2019. The entire content of the above-cited application is hereby incorporated by reference in its entirety for all purposes.

BACKGROUND

The third generation partnership project (3GPP) conducts a research on a new radio in unlicensed spectrum (NR-U). A base station needs to transmit a synchronization signal/PBCH block (SSB) to user equipment (UE) such that the UE can perform initial access.

In NR-U, the base station needs to perform listen before talk (LBT) when transmitting data to the UE. LBT means that when hearing that the unlicensed spectrum is in an idle state, for the unlicensed spectrum, the base station can occupy a certain duration to transmit data or signals. For example, after the LBT is successful, the base station transmits two SSBs and corresponding remaining minimum system information (RMSI) to the UE within 1 ins.

When the base station needs to transmit four SSBs and corresponding RMSI, LBT is required to be performed for the first time, and after the LBT is successful, two SSBs and corresponding RMSI are transmitted. Then, the LBT is performed for the second time, and after the LBT is successful again, the other two SSBs and corresponding RMSI are transmitted.

SUMMARY

The present disclosure relates to the field of mobile communication, in particular to a method for transmitting a synchronization signal/PBCH block, a method for receiving a synchronization signal/PBCH block, apparatuses, a device and a medium.

One aspect of the present application provides the method for transmitting a synchronization signal/PBCH block. The method includes: transmitting, in two continuous slots, four SSBs and remaining minimum system information (RMSI) corresponding to the four SSBs respectively.

One aspect of the present application provides the method for receiving a synchronization signal/PBCH block. The method includes: receiving an SSB and RMSI corresponding to the SSB, where the SSB and the RMSI corresponding to the SSB are one group of the SSB and the RMSI corresponding to the SSB of four SSBs and RMSI corresponding to the four SSBs respectively transmitted by a base station in two continuous slots.

One aspect of the present application provides the apparatus for transmitting a synchronization signal/PBCH block. The apparatus includes: a transmitting module configured to transmit, in two continuous slots, four SSBs and RMSI corresponding to the four SSBs respectively.

It should be understood that the above general description and the following detailed description are only illustrative and explanatory, and cannot limit the present disclosure.

DETAILED DESCRIPTION

Figure 1:
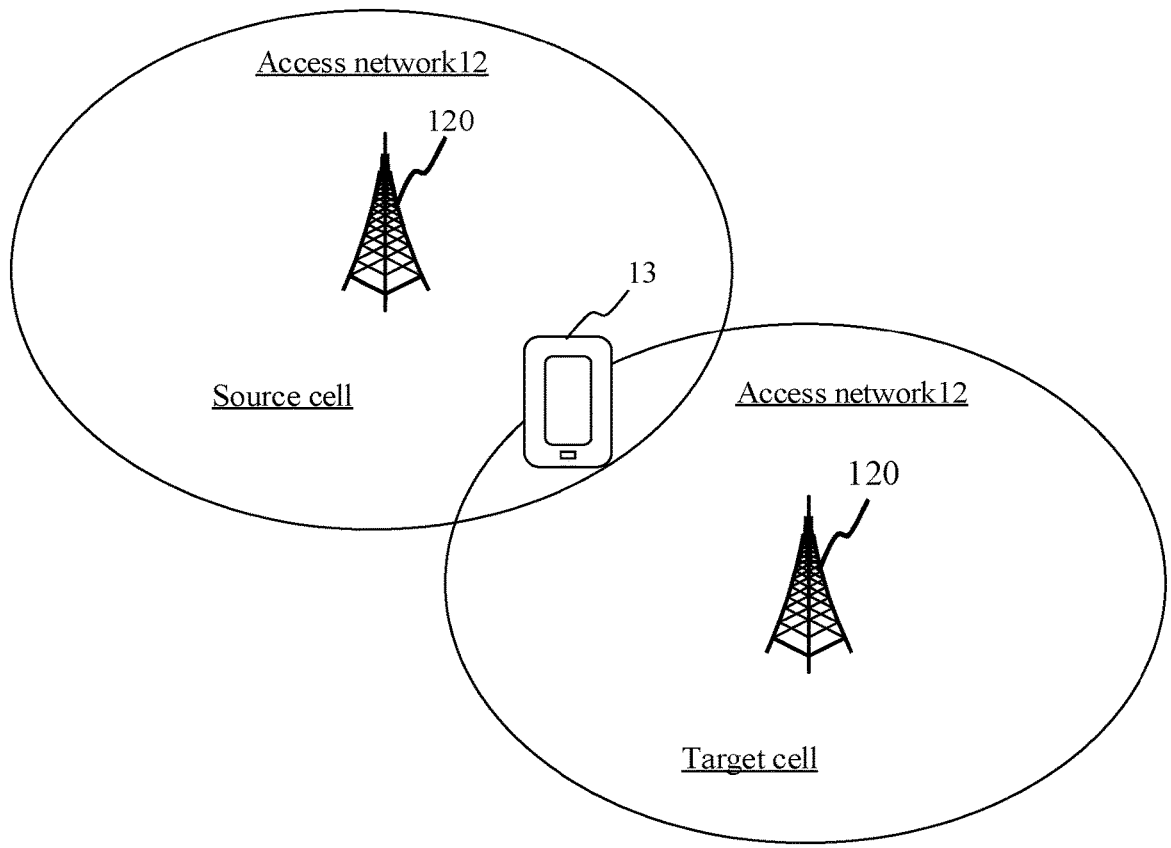
FIG. 1 is a structure block diagram of a communication system shown in one illustrative example.

The illustrative examples will be described in detail herein and shown in the accompanying drawings exemplarily. When the following descriptions relate to the accompanying drawings, unless otherwise specified, the same numeral in different accompanying drawings denotes the same or similar element. The implementations described in the following illustrative examples do not denote all implementations consistent with the present disclosure. On the contrary, they are merely examples of apparatuses and methods consistent with some aspects of the present disclosure as detailed in the appended claims.

The communication system and the service scenario described in the examples of the present application are for more clearly explaining the technical solutions of the examples of the present application, and do not constitute a limitation on the technical solutions provided in the examples of the present application. It can be seen by a person skilled in the art that with the evolution of the communication system and the appearance of a new service scenario, the technical solutions provided in the examples of the present application is also applicable to similar technical problems.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 shows a block diagram of a communication system provided in one illustrative example of the present application. The communication system may include: an access network 12 and a terminal 13.

The access network 12 includes several access network devices 120. The access network device 120 may be a base station, which is an apparatus deployed in the access network to provide a wireless communication function to the terminal. The base station may include various forms of macro base stations, micro base stations, relay stations, access points, etc. In systems employing different radio access technologies, name of devices with base station functions may be different. For example, the device is called evolved node B (eNodeB or eNB) in a long term evolution (LTE) system, and is called next generation evolved node B (gNodeB or gNB) in a 5G NR-U system. The description of "base station" may change as communication technologies evolve. For convenience, in the examples of the present application, the above apparatuses providing the wireless communication function for the terminal 13 are collectively called as access network device. Illustratively, the access network device 120 includes: a source base station and a target base station.

The terminal 13 may include various handheld devices, vehicle-mounted devices, wearable devices, computing devices or other processing devices connected to a wireless modem, where the devices have wireless communication functions, as well as various forms of user equipment (UE), mobile stations (MS), terminal devices, etc. For convenience of description, the above devices are collectively called as terminals. The access network device 120 and the terminal 13 communicate with each other by means of a certain kind of air interface technology, such as a Uu interface.

The terminal accesses to a cell by executing cell search and random access processes after starting up. In NR-U, the cell search is mainly completed on the basis of detection of a downlink synchronization channel and signal. The terminal obtains a cell identification (ID), frequency synchronization and downlink time synchronization by means of the cell search process. The cell search process further includes: a primary synchronization signal (PSS) search, a secondary synchronization signal (SSS) search and physical broadcast channel (PBCH) detection.

The downlink synchronization channel and signal include a plurality of synchronization signal/PBCH burst sets, and each synchronization signal/PBCH burst set includes one or more synchronization signal/PBCH blocks. Each synchronization signal/PBCH block includes: transmission of the PSS, the SSS and the PBCH.

Synchronization Signal/PBCH Burst Set

A design goal of a new radio (NR) system is to support carrier frequencies of 0-100 GHz. However, when the system operates in millimeter wave band, a beamforming technology is often needed to provide cell coverage. At the same time, due to a limitation of hardware, the base station may not transmit a plurality of beams covering the whole cell simultaneously, such that a beam scanning technology is introduced to solve a problem of cell coverage.

Figure 2:
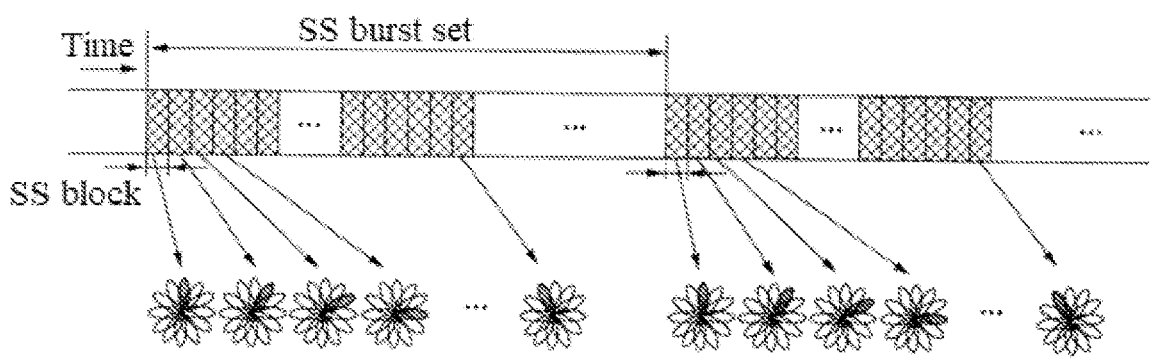
FIG. 2 is a flow diagram of a method for transmitting a synchronization signal/PBCH burst set shown in one illustrative example.

The so-called "beam scanning" means that the base station transmits beams in only one or a few directions at a certain moment. Different beams are transmitted at a plurality of moments to cover all directions needed for the whole cell. The SSB set is designed for beam scanning and is used to transmit the PSS, SSS and PBCH (these signals constitute one synchronization signal/PBCH block) needed by the terminal for cell search in each beam direction. The synchronization signal/PBCH burst set (SS burst set) is a set of a plurality of SSBs in a certain time period, and each SSB corresponds to one beam direction in the same period. Meanwhile, the beam direction of each SSB in the same SS burst set covers the whole cell. FIG. 2 shows a schematic diagram of transmitting an SSB in different beam directions at a plurality of moments. However, it should be noted that when a NR system operates at a low frequency and a beam scanning technology is not needed, the use of an SS burst set is still beneficial to improving cell coverage, because UE may accumulate more energy when receiving a plurality of time-division multiplexed synchronization signal/PBCH blocks in the SS burst set. Illustratively, one SS burst set is limited to a certain 5-ms half-frame, and a start is at a 0th slot of the half-frame.

Figure 3:
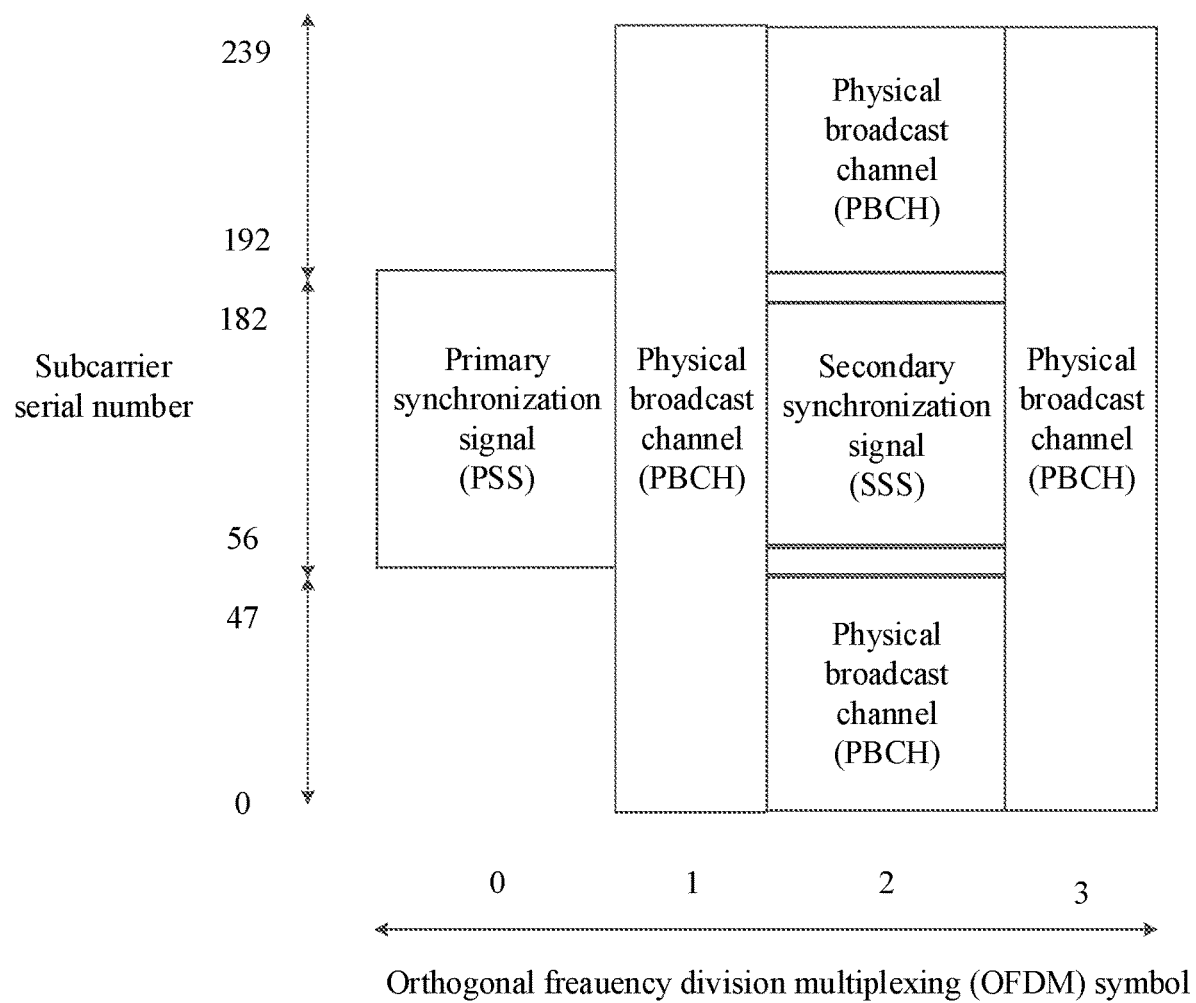
FIG. 3 is a schematic diagram of an interface of a synchronization signal/PBCH block shown in one illustrative example.

As shown in FIG. 3, an SSB occupies 4 orthogonal frequency division multiplexing (OFDM) symbols in a time domain, and index marking is carried out from 0 to 3 in the SSB. Moreover, the SSB occupies a frequency domain width of 20 resource blocks (RBs) in a frequency domain, and occupies 240 subcarriers at most (each RB includes 12 subcarriers), where an RB index and a subcarrier index in the frequency domain may be marked in ascending order from 0 respectively.

UE first searches a PSS, where the PSS is in a pseudo-random sequence with a length of 127 bits, and a frequency domain binary phase shift keying M (BPSK M) sequence is used. The PSS is mapped to 127 continuous subcarriers (56-182) of 12 physical resource blocks (PRBs) and occupies 144 subcarriers, guard intervals are made on two sides, and no power is transmitted. The UE may obtain a subcarrier spacing of the SSB after searching the PSS.

An SSS has a frequency domain similar to that of the PSS, is mapped to 127 continuous subcarriers of 12 PRBs and occupies 144 subcarriers. The UE may obtain a unique physical layer cell ID after searching the SSS.

After the UE searches the PSS/SSS and obtains a physical cell number, the PBCH is demodulated in a next step. A position of a demodulation reference signal (DMRS) of a PBCH is needed to be obtained in order to demodulate the PBCH. The DMRS of the PBCH and the PBCH have the same position in a time domain, and spaced by four subcarriers in a frequency domain. An initial offset is determined by the physical cell number.

After the UE obtains the SSB, some necessary system information is needed to be obtained, so as to complete cell dragging and initial access, and these necessary system information is called remaining minimum system information (RMSI) in NR. In some aspects, RMSI may be considered as a system information block 1 (SIB1) message in LTE and is mainly transmit by a physical downlink shared channel (PDSCH), where downlink control information (DCI) of a physical downlink control channel (PDCCH) is needed to schedule the PDSCH. The UE needs to obtain information of the PDCCH for scheduling the RMSI in a master information block (MIB), and carries out a blind test on the PDCCH to obtain the RMSI, where the information in the MIB is a pdcch-ConfigSIB1 field. The UE obtains the MIB from the SSB.

Illustratively, the UE may determine, by means of a parameter ssb-SubcarrierOffset in the MIB, whether a control resource set (CORESET) is contained in a frequency domain where a current SSB is positioned or not, that is, weather a Type0-PDCCH common search space is configured or not, so as to determine whether the RMSI is configured in the frequency domain where the current SSB is positioned in the cell or not. Under certain conditions, when the UE detects that no RMSI is configured in the frequency domain where the current SSB is positioned in the cell, whether a Type0-PDCCH common search space in a frequency domain where a next SSB is positioned and in a certain offset range of the current SSB provides a CORESET or not may be detected by means of a parameter pdcch-ConfigSIB1 contained in a MIB message. If the UE still does not detect a common CORESET, it may be considered that no RMSI is configured in the cell, and a cell search flow of a corresponding frequency point obtained by a previously frequency locked SSB is abandoned.

"The PDCCHs and the PDSCHs of the SSB and the RMSI" together may be defined as a discovery reference signal (DRS). The DRS is continuously transmit for 1 ins at most. The inventor found that a base station simultaneously transmits four SSBs within 1 ins (one-time maximum transmitting time of the DRS), because the PDSCH of the RMSI corresponding to the four SSBs does not have a corresponding transmission mode.

Under the circumstance that a subcarrier spacing is 30 kHz, in a design known to the inventor, 28 continuous symbols are needed to transmit the four SSBs, which exceeds a length of 1 ins (26 symbols). Therefore, the four SSBs and the corresponding RMSI may not be transmitted within 1 ins, such that the base station needs to transmit the four SSBs for two times, that is, listen before talk (LBT) needs to be carried out for two times, and one more time of the LBT will cause delay and an increase of a power consumption of the UE, and system performance is reduced. Therefore, the following examples are provided.

Figure 4:
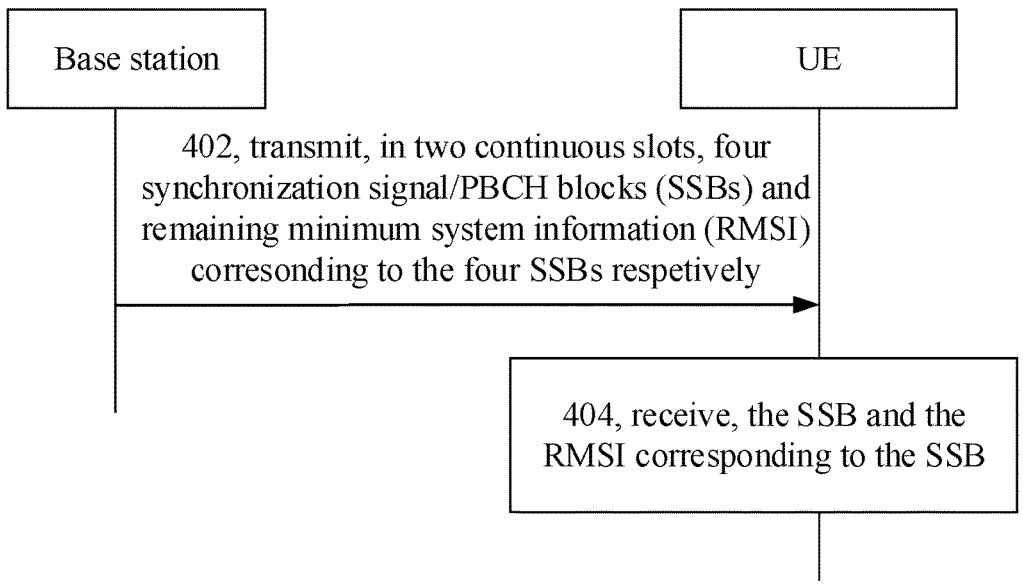
FIG. 4 is a flow diagram of a method for transmitting a synchronization signal/PBCH block shown in one illustrative example.

FIG. 4 shows a flow diagram of a method for transmitting a synchronization signal/PBCH block provided in one illustrative example of the present disclosure. The method may be implemented by the access network device and the terminal shown in FIG. 1, and the access network device being a base station is taken as an example. The method includes:

Step 402, transmit in two continuous slots, by the base station, four SSBs and RMSI corresponding to the four SSBs respectively.

Figure 5:
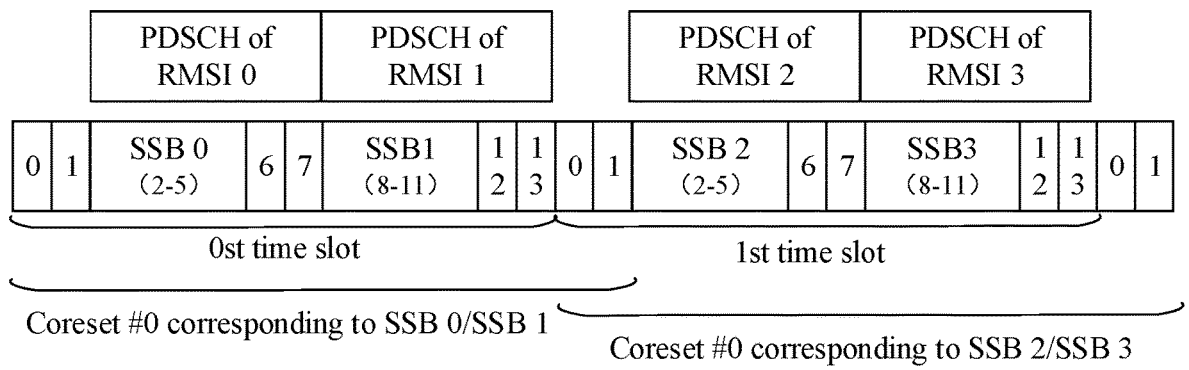
FIG. 5 is a diagram of time-frequency resource positions of four synchronization signal/PBCH blocks (SSBs) and corresponding remaining minimum system information (RMSI) shown in another illustrative example.

Illustratively, a subcarrier spacing of the two slots is 30 kHz, and each slot includes 14 symbols. The above four SSBs including: an SSB 0, an SSB 1, an SSB 2 and an SSB 3 are taken as examples, and as shown in FIG. 5, two continuous slots include: a 0th slot and a 1st slot.

The SSB 0 and a PDCCH and a PDSCH of RMSI 0 corresponding to the SSB 0 and the SSB 1 and a PDCCH and a PDSCH of RMSI 1 corresponding to the SSB 1 are transmitted in the 0th slot. The SSB 2 and a PDCCH and a PDSCH of RMSI 2 corresponding to the SSB 2 and the SSB 3 and a PDCCH and a PDSCH of RMSI 3 corresponding to the SSB 3 are transmitted in the 1st slot.

Illustratively, each of the four SSBs is scanned and transmitted by using a different beam, that is, the four SSBs are transmitted in a beam scanning manner respectively.

Step 404, receive, by UE, the SSB and the RMSI corresponding to the SSB, where the SSB and the RMSI corresponding to the SSB are one group of the SSB and the RMSI corresponding to the SSB of the four SSBs and the RMSI corresponding to the four SSBs respectively transmitted by a base station in the two continuous slots.

The UE receives one group of the SSB and the RMSI when being in a coverage range of a cell provided by the base station. The group of the SSB and the RMSI is one of four groups of the SSBs and the RMSI. That is, the SSB 0 and the RMSI 0, the SSB 1 and the RMSI 1, the SSB 2 and the RMSI 2, or the SSB 3 and the RMSI 3.

In conclusion, the method provided in the example provides a mode for simultaneously transmitting the four SSBs and the corresponding RMSI within 1 ins [a one-time maximum transmitting duration of a DRS], may meet a requirement that in a NR-U scene, the four SSBs and the corresponding RMSI may be simultaneously transmitted by only one-time LBT, reduces the number of times of the LBT of the base station, improves a throughput of a communication system, and may save the electric quantity of the UE.

Figure 6:
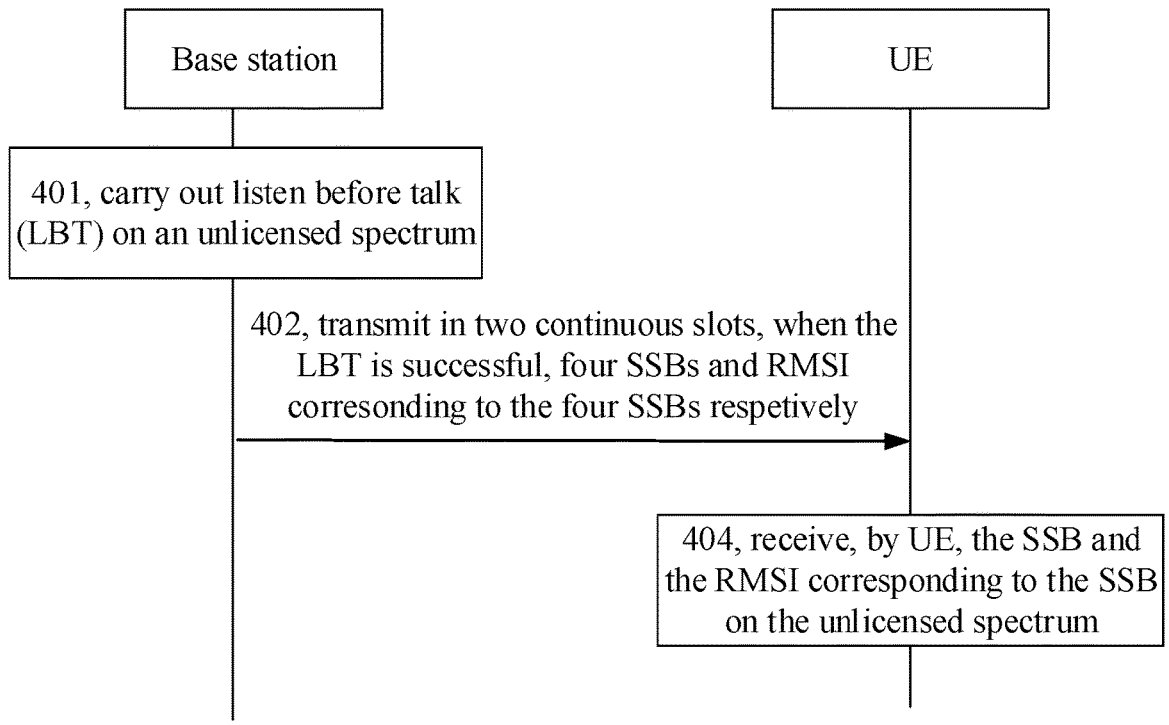
FIG. 6 is a flow diagram of a method for transmitting a synchronization signal/PBCH block shown in one illustrative example.

FIG. 6 shows a flow diagram of a method for transmitting a synchronization signal/PBCH block provided in one illustrative example of the present disclosure. The method may be implemented by access network device and a terminal in a NR-U scene, and the access network device being a base station is taken as an example. The method includes:

Step 401, carry out LBT on an unlicensed spectrum by a base station.

The LBT needs to be carried out first when the base station uses the unlicensed spectrum. For example, the LBT is in an LBT Cat2 level, or an LBT Cat4 level, etc. The example does not limit the LBT mode of the base station.

When the LBT is successful, step 402 is implemented; and when the LBT fails, the base station carries out retreat.

Step 402, transmit in two continuous slots, by a base station when the LBT is successful, four SSBs and RMSI corresponding to the four SSBs respectively.

Illustratively, a subcarrier spacing of the two slots is 30 kHz, and each slot includes 14 symbols. The above four SSBs including: an SSB 0, an SSB 1, an SSB 2 and an SSB 3 are taken as examples, and as shown in FIG. 5, the two continuous slots include: the 0th slot and the 1st slot.

The SSB 0 and a PDCCH and a PDSCH of RMSI 0 corresponding to the SSB 0 and the SSB 1 and a PDCCH and a PDSCH of RMSI 1 corresponding to the SSB 1 are transmitted in the 0th slot. The SSB 2 and a PDCCH and a PDSCH of RMSI 2 corresponding to the SSB 2 and the SSB 3 and a PDCCH and a PDSCH of RMSI 3 corresponding to the SSB 3 are transmitted in the 1st slot.

The SSB 0 is carried in 2nd to 5th symbols of the 0th slot, the PDCCH of the RMSI 0 corresponding to the SSB 0 is carried in a 0th symbol of the 0th slot, and the PDSCH of the RMSI 0 corresponding to the SSB 0 is carried in 2nd to 7th symbols of the 0th slot. A frequency division multiplexing (TDM) mode is used for the PDSCHs of the SSB 0 and the RMSI 0.

The SSB 1 is carried in 8th to 11th symbols of the 0th slot, the PDCCH of the RMSI 1 corresponding to the SSB 1 is carried in a 1st symbol of the 0th slot, and the PDSCH of the RMSI 1 corresponding to the SSB 1 is carried in the 8th to 11th symbols of the 0th slot. A TDM mode is used for the PDSCHs of the SSB 1 and the RMSI 1.

The SSB 2 is carried in 2nd to 5th symbols of the 1st slot, the PDCCH of the RMSI 2 corresponding to the SSB 2 is carried in a 0th symbol of the 1st slot, and the PDSCH of the RMSI 2 corresponding to the SSB 2 is carried in 2nd to 7th symbols of the 1st slot. A TDM mode is used for the PDSCHs of the SSB 2 and the RMSI 2.

The SSB 3 is carried in 8th to 11th symbols of the 1st slot, the PDCCH of the RMSI 3 corresponding to the SSB 3 is carried in a 1st symbol of the 1st slot, and the PDSCH of the RMSI 3 corresponding to the SSB 3 is carried in the 8th to 11th symbols of the 1st slot. A TDM mode is used for the PDSCHs of the SSB 3 and the RMSI 3.

Illustratively, each of the four SSBs is scanned and transmitted by using a different beam, that is, the four SSBs are transmitted in a beam scanning manner respectively.

Step 404, receive, by UE, the SSB and the RMSI corresponding to the SSB on the unlicensed spectrum, where the SSB and the RMSI corresponding to the SSB are one group of the SSB and the RMSI corresponding to the SSB of the four SSBs and the RMSI corresponding to the four SSBs respectively transmitted by the base station in the two continuous slots.

The UE receives one group of the SSB and the RMSI when being in a coverage range of a cell provided by the base station. The group of the SSB and the RMSI is one of four groups of the SSBs and the RMSI. That is, the SSB 0 and the RMSI 0, the SSB 1 and the RMSI 1, the SSB 2 and the RMSI 2, or the SSB 3 and the RMSI 3.

In conclusion, the method provided in the example provides a mode for simultaneously transmitting the four SSBs and the corresponding RMSI within 1 ins [a one-time maximum transmitting duration of a DRS], and the base station may transmit the four SSBs and the corresponding RMSI simultaneously by only one-time LBT, such that the number of times of the LBT of the base station is reduced, a throughput of a communication system is improved, and the electric quantity of the UE may be saved.

On the basis of the examples shown in FIGS. 4 and 6, the step of transmitting, in two continuous slots, four SSBs and RMSI corresponding to the four SSBs respectively of step 402 includes:

transmit, according to a first configuration and in the 0th symbol of the 0th slot, the PDCCH of the RMSI corresponding to the SSB 0; transmit, in the 1st symbol of the 0th slot, the PDCCH of the RMSI corresponding to the SSB 1; transmit, in the 0th symbol of the 1st slot, the PDCCH of the RMSI corresponding to the SSB 2; and transmit, in the 1st symbol of the 1st slot, the PDCCH of the RMSI corresponding to the SSB 3;

transmit, according to a second configuration and in 2nd to A-th symbols of the 0th slot, the PDSCH of the RMSI corresponding to the SSB 0; and transmit, in 2nd to A-th symbols of the 1st slot, the PDSCH of the RMSI corresponding to the SSB 2, where A is 6 or 7; and transmit, according to a third configuration and in 8th to B-th symbols of the 0th slot, the PDSCH of the RMSI corresponding to the SSB 1; and transmit, in 8th to B-th symbols of the 1st slot, the PDSCH of the RMSI corresponding to the SSB 3. B is 12 or 13.

Illustratively, A being 7 and B being 13 are taken as examples for description in FIG. 5.

In one example, the first configuration includes configuration information of a PDCCH common search space of a type 0, where the configuration information of the PDCCH common search space of the type 0 is as follows:

$$n_0 = (O*2_\mu + [i*M]) \bmod N_{slot}^{frame,\mu},$$

where $M=\frac{1}{2}$, $O=0$, $\mu$ is a subcarrier spacing, $i$ is an index of the SSB, $n_0$ is an index of the slot, $N_{slot}^{frame,\mu}$ is the number of slot of each subframe of a subcarrier spacing configuration, and mod is a modulo operation. There are two search space sets in each slot.

With reference to FIG. 5, the search space for Coreset #0 determined according to the above configuration information includes: a 0th symbol and a 1st symbol of a current slot, and a 0th symbol and a 1st symbol of a next slot. However, UE only needs to search the 0th symbol and the 1st symbol of the current slot, and does not need to search the 0th symbol and the 1st symbol of the next slot, such that the UE may transmit four SSBs and RMSI within 1 ins (26 symbols). That is, after receiving the SSB 2 and the SSB 3, the UE does not need to search the last two symbols (a 0th symbol and a 1st symbol of a 2nd slot) in FIG. 5, but only needs to search the 0th symbol and the 1st symbol of the 1st slot.

In one example, the example of the present application provides a configuration table of a PDSCH of RMSI, which is as shown in Table 1 below.

TABLE 1

| Index number | Type A position of DMRS | Mapping type of PDSCH | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 (or 6) |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 8 | 6 (or 5) |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In one example, a second configuration includes: a slot offset $K_0$ of a PDSCH being 0, a start symbol S being 2, an allocation length L being 5 (or 6), a resource mapping type being a type A, and a type A position of a DMRS being 2.

Illustratively, when the allocation length L is 5, the PDSCH of the RMSI 0 of the SSB 0 (or the SSB 2) is carried in 2nd to 6th symbols. When the allocation length L is 6, the PDSCH of the RMSI 0 of the SSB 0 (or the SSB 2) is carried in 2nd to 7th symbols.

Illustratively, in combination with Table 1, the second configuration may employ a configuration of the PDSCH of the RMSI with an index number of 5. With reference to FIG. 5, the PDCCH of the RMSI 0 corresponding to the SSB 0 carries the second configuration, and is positioned in the 0th symbol of the 0th slot. The PDCCH of the RMSI2 corresponding to the SSB 2 carries the second configuration, and is positioned in the 0th symbol of the 1st slot.

In one example, a third configuration includes: a slot offset $K_0$ of a PDSCH being 0, a start symbol S being 8, an allocation length L being 6 (or 5), a resource mapping type being a type A, and a type A position of a DMRS being 2.

Illustratively, in combination with Table 1, the third configuration may employ a configuration of the PDSCH of the RMSI with an index number of 13. With reference to FIG. 5, the PDCCH of the RMSI 1 corresponding to the SSB 1 carries the third configuration, and is positioned in the 1st symbol of the 0th slot. The PDCCH of the RMSI 3 corresponding to the SSB 3 carries the third configuration, and is positioned in the 1st symbol of the 1st slot.

In one example, in the example of the present application, a configuration definition of the PDSCH needs to be added, which is as shown in Table 2 below.

TABLE 2

| Configuration type of PDSCH | $K_0$ | S | L |
|---|---|---|---|
| Type A | 0 | 8 | 6 (or 5) |

Illustratively, when the allocation length L is 6, the PDSCH of the RMSI 1 of the SSB 1 (or the SSB 3) is carried in 8th to 13th symbols. When the allocation length L is 5, the PDSCH of the RMSI 1 of the SSB 1 (or the SSB 3) is carried in 8th to 12th symbols.

Figure 7:
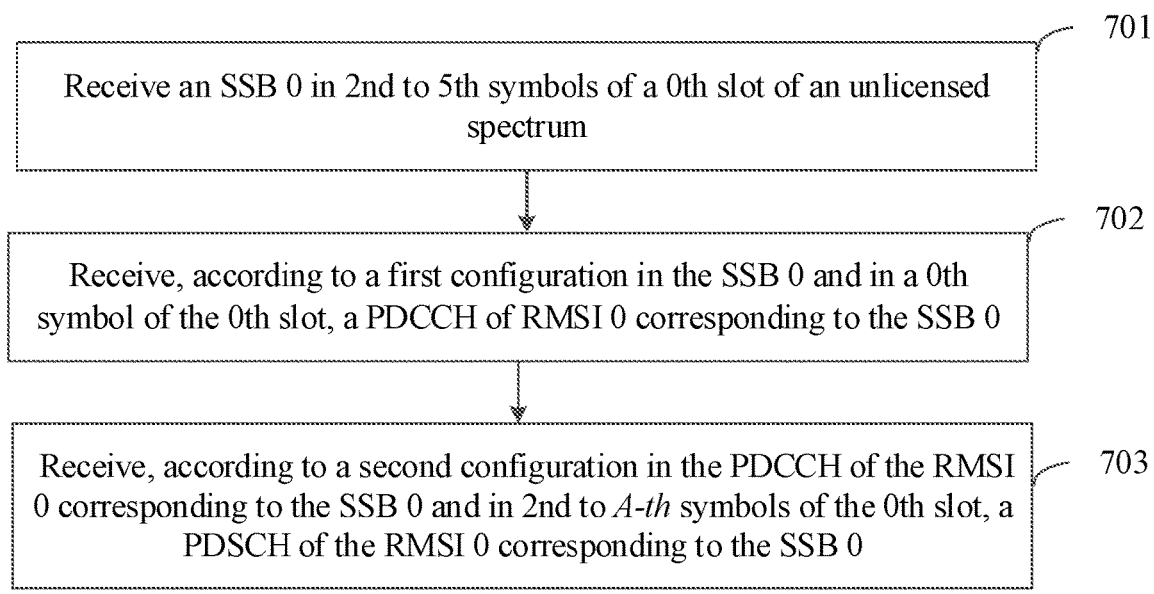
FIG. 7 is a flow diagram of a method for receiving a synchronization signal/PBCH block shown in one illustrative example.

On the basis of the examples shown in FIGS. 4 and 6, the step of receiving, by UE, the SSB 0 and the RMSI 0 corresponding to the SSB 0 of step 404 includes: as shown in FIG. 7, step 701, receive an SSB 0 in 2nd to 5th symbols of a 0th slot of an unlicensed spectrum;

step 702, receive, according to a first configuration in the SSB 0 and in a 0th symbol of the 0th slot, a PDCCH of RMSI 0 corresponding to the SSB 0; and step 703, receive, according to a second configuration in the PDCCH of the RMSI 0 corresponding to the SSB 0 and in 2nd to A-th symbols of the 0th slot, a PDSCH of the RMSI 0 corresponding to the SSB 0.

A is 6 or 7. A being 7 is taken as an example for description in the example.

Figure 8:
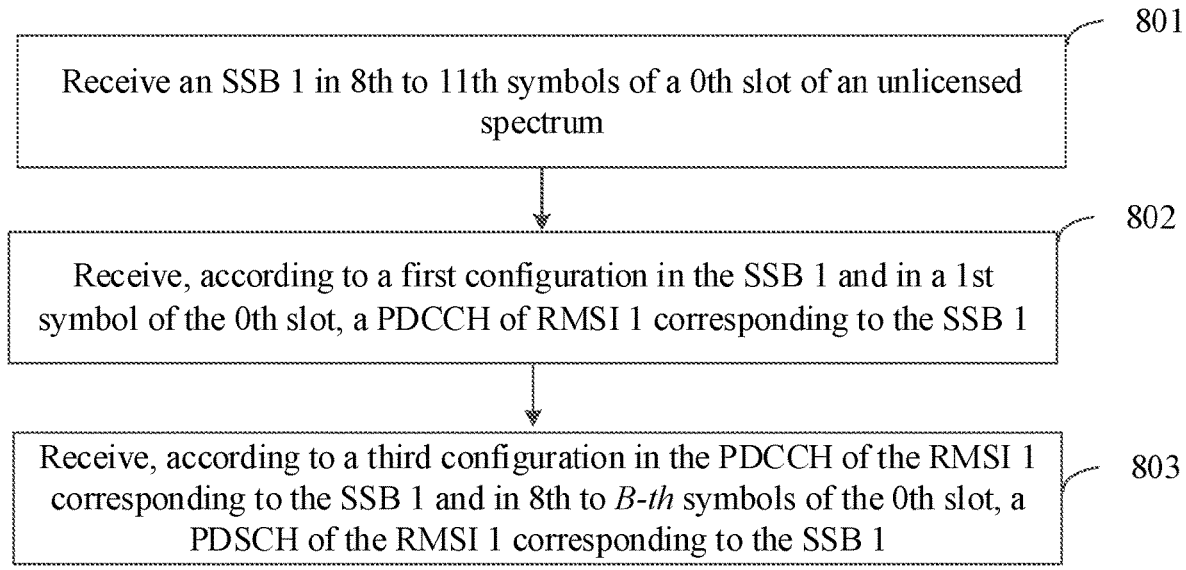
FIG. 8 is a flow diagram of a method for receiving a synchronization signal/PBCH block shown in one illustrative example.

On the basis of the examples shown in FIGS. 4 and 6, the step of receiving, by UE, the SSB 1 and the RMSI 1 corresponding to the SSB 1 of step 404 includes: as shown in FIG. 8, step 801, receive an SSB 1 in 8th to 11th symbols of a 0th slot of an unlicensed spectrum;

step 802, receive, according to a first configuration in the SSB 1 and in a 1st symbol of the 0th slot, a PDCCH of RMSI 1 corresponding to the SSB 1; and step 803, receive, according to a third configuration in the PDCCH of the RMSI 1 corresponding to the SSB 1 and in 8th to B-th symbols of the 0th slot, a PDSCH of the RMSI 1 corresponding to the SSB 1.

B is 12 or 13. B being 13 is taken as an example for description in the example.

Figure 9:
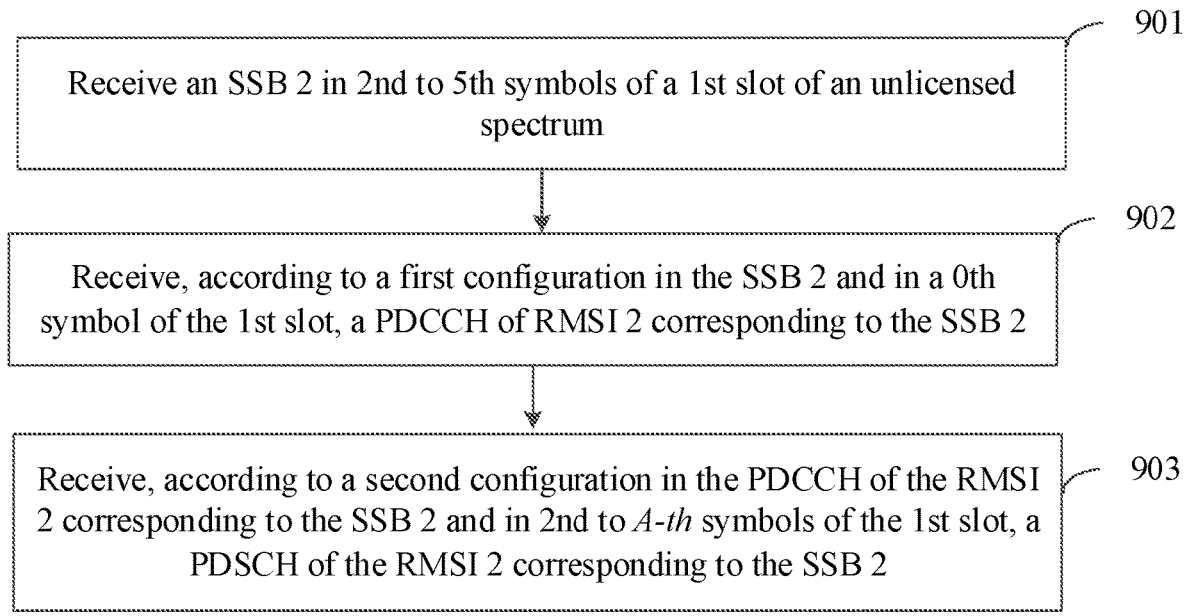
FIG. 9 is a flow diagram of a method for receiving a synchronization signal/PBCH block shown in one illustrative example.

On the basis of the examples shown in FIGS. 4 and 6, the step of receiving, by UE, the SSB 2 and the RMSI 2 corresponding to the SSB 2 of step 404 includes: as shown in FIG. 9, step 901, receive the SSB 2 in 2nd to 5th symbols of a 1st slot of an unlicensed spectrum;

step 902, receive, according to a first configuration in the SSB 2 and in a 0th symbol of the 1st slot, a PDCCH of RMSI 2 corresponding to the SSB 2; and step 903, receive, according to a second configuration in the PDCCH of the RMSI 2 corresponding to the SSB 2 and in 2nd to A-th symbols of the 1st slot, a PDSCH of the RMSI 2 corresponding to the SSB 2.

A is 6 or 7. A being 7 is taken as an example for description in the example.

Figure 10:
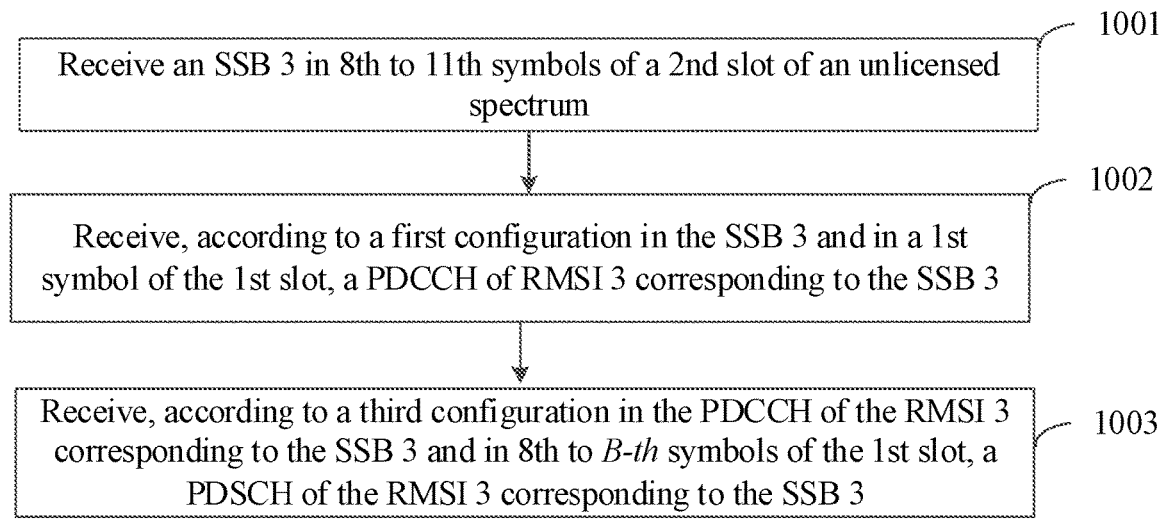
FIG. 10 is a flow diagram of a method for receiving a synchronization signal/PBCH block shown in one illustrative example.

On the basis of the examples shown in FIGS. 4 and 6, the step of receiving, by UE, the SSB 3 and the RMSI 3 corresponding to the SSB 3 of step 404 includes: as shown in FIG. 10, step 1001, receive an SSB 3 in 8th to 11th symbols of a 2nd slot of an unlicensed spectrum;

step 1002, receive, according to a first configuration in the SSB 3 and in a 1st symbol of the 1st slot, a PDCCH of RMSI 3 corresponding to the SSB 3; and step 1003, receive, according to a third configuration in the PDCCH of the RMSI 3 corresponding to the SSB 3 and in 8th to B-th symbols of the 1st slot, a PDSCH of the RMSI 3 corresponding to the SSB 3.

B is 12 or 13. B being 13 is taken as an example for description in the example.

Figure 11:
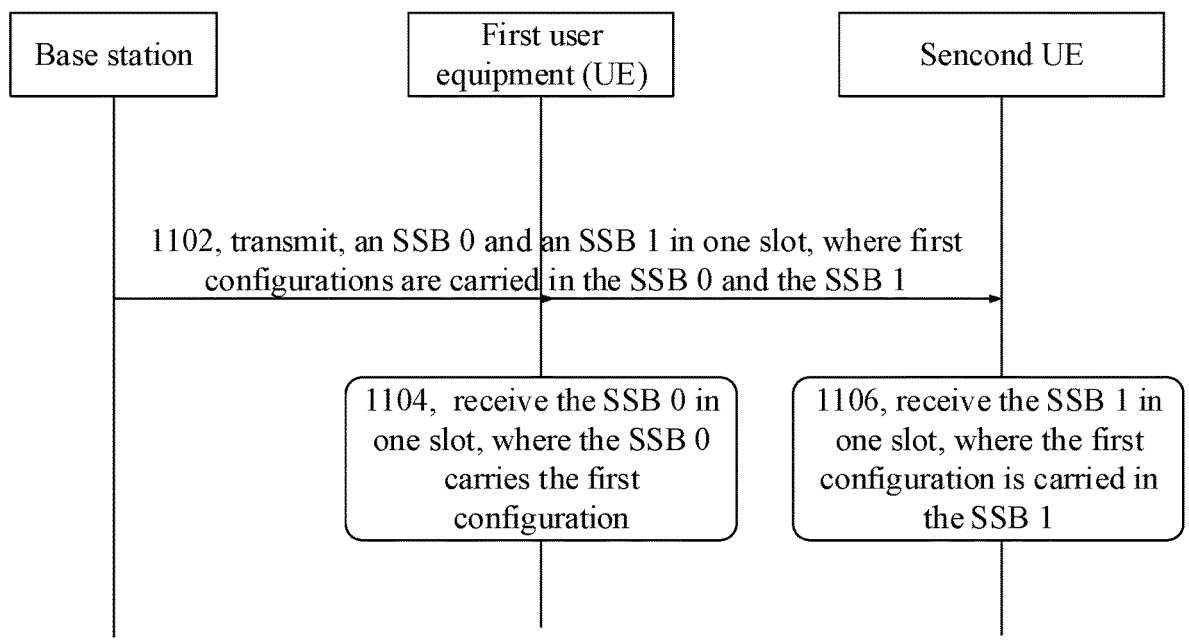
FIG. 11 is a flow diagram of a method for configuring a physical downlink control channel (PDCCH) of RMSI shown in one illustrative example.

FIG. 11 shows a flow diagram of a method for configuring a PDCCH of RMSI provided in one illustrative example of the present disclosure. The method may be applied in the communication system shown in FIG. 1 to be implemented, taking the access network device being a base station as an example. The method includes:

Step 1102, transmit, by the base station, an SSB 0 and an SSB 1 in one slot, where first configurations are carried in the SSB 0 and the SSB 1.

The first configuration is used for indicating that the PDCCH of the RMSI of the SSB 0 is searched in a 0th symbol of the slot, and/or indicating that the PDCCH of the RMSI of the SSB 1 is searched in a 1st symbol of the slot.

In one example, the first configuration includes configuration information of a PDCCH common search space of a type 0, where the configuration information of the PDCCH common search space of the type 0 is as follows:

$$n_0 = (O*2_\mu + [i*M]) \bmod N_{slot}^{frame,\mu},$$

where M=½, O=0, μ is a subcarrier spacing, i is an index of the SSB, $n_0$ is an index of the slot, $N_{slot}^{frame,\mu}$ is the number of slot of each subframe of a subcarrier spacing configuration, and mod is a modulo operation. There are two search space sets in each slot.

Step 1104, receive, by first UE, the SSB 0 in one slot, where the SSB 0 carries the first configuration, and the first configuration is used for indicating that the PDCCH of the RMSI of the SSB 0 is searched in a 0th symbol of the slot.

Step 1106, receive, by second UE, the SSB 1 in one slot, where the first configuration is carried in the SSB 1, and the first configuration is used for indicating that the PDCCH of the RMSI of the SSB 1 is searched in a 1st symbol of the slot.

It should be noted that the SSB 0 and the SSB 1 in the example may be replaced by the SSB 2 and the SSB 3 provided in the above example, which will not be repeated.

Figure 12:
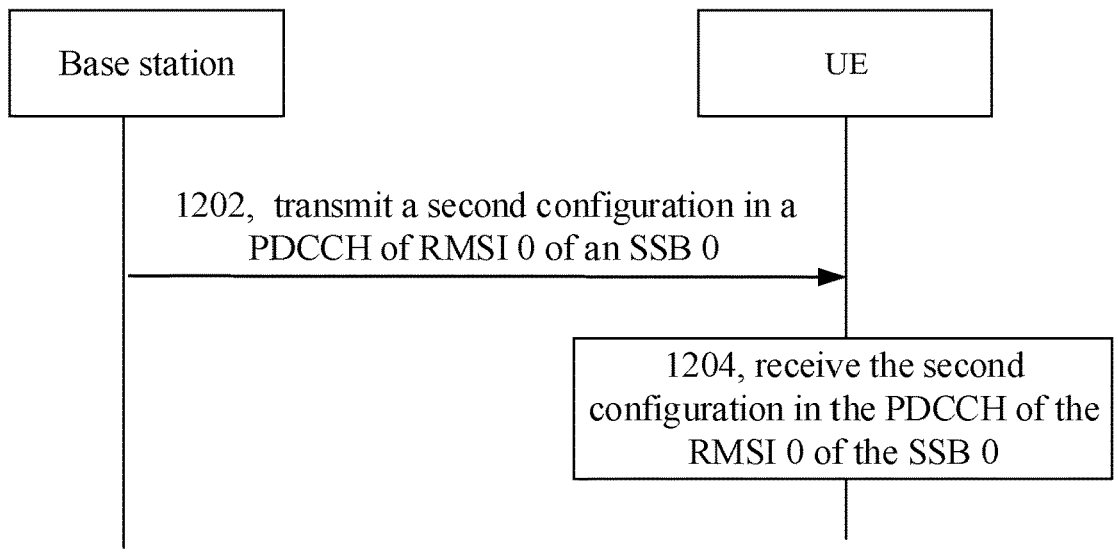
FIG. 12 is a flow diagram of a method for configuring a physical downlink shared channel (PDSCH) of RMSI shown in one illustrative example.

FIG. 12 shows a flow diagram of a method for configuring a PDSCH of RMSI provided in one illustrative example of the present disclosure. The method may be applied in the communication system shown in FIG. 1 to be implemented, taking the access network device being a base station as an example. The method includes:

Step 1202, transmit, by the base station, a second configuration in the PDCCH of the RMSI 0 of an SSB 0, where the second configuration is used for indicating that the PDSCH of the RMSI of the SSB 0 is received in 2nd to A-th symbols of one slot.

In one example, the second configuration includes: a slot offset $K_0$ of a PDSCH being 0, a start symbol S being 2, an allocation length being 5 (or 6), a resource mapping type being a type A, and a type A position of a DMRS being 2.

A is 6 or 7. Illustratively, when the allocation length L is 5, A=6; and when the allocation length L is 6, A=7.

In one example, an index number of the second configuration is 5.

Step 1204, receive, by UE, a second configuration in the PDCCH of the RMSI 0 of the SSB 0, where the second configuration is used for indicating that the PDSCH of the RMSI of the SSB 0 is received in 2nd to A-th symbols of one slot.

It should be noted that the SSB 0 in the example may be replaced by the SSB 2 provided in the above example, which will not be repeated.

Figure 13:
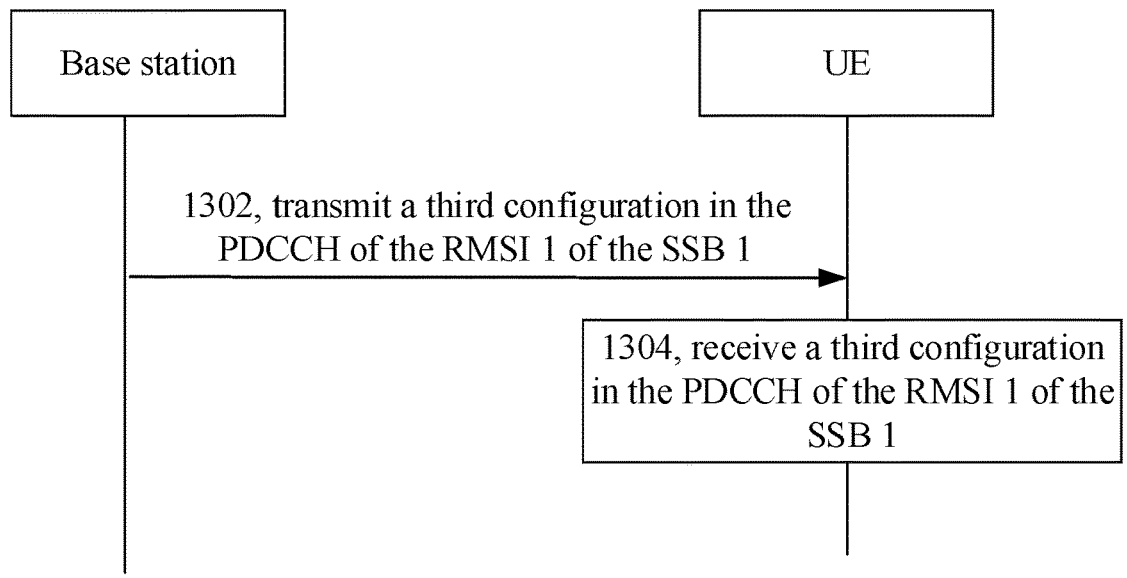
FIG. 13 is a flow diagram of a method for configuring a PDSCH of RMSI shown in one illustrative example.

FIG. 13 shows a flow diagram of a method for configuring a PDSCH of RMSI provided in one illustrative example of the present disclosure. The method may be applied in the communication system shown in FIG. 1 to be implemented, taking the access network device being a base station as an example. The method includes:

Step 1302, transmit, by the base station, a third configuration in the PDCCH of the RMSI 1 of the SSB 1, where the third configuration is used for indicating that the PDSCH of the RMSI of the SSB 1 is received in 8th to 13th symbols of one slot.

In one example, the third configuration includes: a slot offset $K_0$ of a PDSCH being 0, a start symbol S being 8, an allocation length being 5 (or 6), a resource mapping type being a type A, and a type A position of a DMRS being 2.

In one example, an index number of the third configuration is 13.

B is 12 or 13. Illustratively, when the allocation length L is 5, B=12; and when the allocation length L is 6, B=13.

Step 1304, receive, by UE, a third configuration in the PDCCH of the RMSI 1 of the SSB 1, where the third configuration is used for indicating that the PDSCH of the RMSI of the SSB 1 is received in 8th to 13th symbols of one slot.

It should be noted that the SSB 1 in the example may be replaced by the SSB 3 provided in the above example, which will not be repeated.

In each of the above examples, the steps carried out by the base station may be implemented to a method on an access network device side, and the steps carried out by the UE may be implemented to be a method on a UE side.

The following is apparatus examples of the present application, and for details not described in detail in the apparatus examples, reference may be made to the above method examples.

Figure 14:
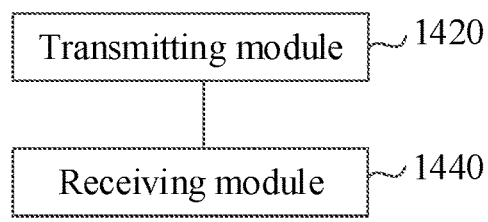
FIG. 14 is a block diagram of an apparatus for transmitting a synchronization signal/PBCH block shown in one illustrative example.

FIG. 14 shows a block diagram of an apparatus for transmitting a synchronization signal/PBCH block provided in one illustrative example of the present application. The apparatus may be implemented by means of software, hardware (a processor, a memory and a baseband chip), or a combination thereof to be all or part of the access network device. The apparatus includes: a transmitting module 1420 and a receiving module 1440.

The transmitting module 1420 is configured to transmit, in two continuous slots, four SSBs and RMSI corresponding to the four SSBs respectively.

In one possible design, the receiving module 1440 is configured to carry out LBT on an unlicensed spectrum; and
  the transmitting module 1420 is configured to transmit, when the LBT is successful and in the two continuous slots, the four SSBs and the RMSI corresponding to the four SSBs respectively.

In one possible design, each slot includes 14 symbols, and the four SSBs include: an SSB 0, an SSB 1, an SSB 2 and an SSB 3.

The transmitting module 1420 is configured to carry the SSB 0 in 2nd to 5th symbols of a 0th slot for transmitting; carry the SSB 1 in 8th to 11th symbols of the 0th slot for transmitting; carry the SSB 2 in 2th to 5th symbols of the 1st slot for transmitting; and carry the SSB 3 in 8th to 11th symbols of the 1st slot for transmitting.

In one possible design, each slot includes 14 symbols, and the four SSBs include: an SSB 0, an SSB 1, an SSB 2 and an SSB 3. The transmitting module 1420 is configured to
  transmit, according to a first configuration and in a 0th symbol of a 0th slot, a PDCCH of RMSI corresponding to the SSB 0; transmit, in a 1st symbol of the 0th slot, a PDCCH of RMSI corresponding to the SSB 1; transmit, in a 0th symbol of a 1st slot, a PDCCH of RMSI corresponding to the SSB 2; and transmit, in a 1st symbol of the 1st slot, a PDCCH of RMSI corresponding to the SSB 3;
  transmit, according to a second configuration and in 2nd to A-th symbols of the 0th slot, a PDSCH of the RMSI corresponding to the SSB 0; and transmit, in 2nd to A-th symbols of the 1st slot, a PDSCH of the RMSI corresponding to the SSB 2, where A is 6 or 7; and transmit, according to a third configuration and in 8th to B-th symbols of the 0th slot, a PDSCH of the RMSI corresponding to the SSB 1; and transmit, in 8th to B-th symbols of the 1st slot, a PDSCH of the RMSI corresponding to the SSB 3, where B is 12 or 13.

In one possible design, the first configuration includes configuration information of a PDCCH common search space of a type 0, where the configuration information of the PDCCH common search space of the type 0 is as follows:

$$n_0 = (O*2_\mu + [i*M]) \bmod N_{slot}^{frame,\mu},$$

where M=½, O=0, μ is a subcarrier spacing, i is an index of the SSB, $n_0$ is an index of the slot, $N_{slot}^{frame,\mu}$ is the number of slot of each subframe of a subcarrier spacing configuration, and mod is a modulo operation.

In one possible design, the configuration information of the first configurations is carried in the SSB 1 and the SSB 3.

In one possible design, the second configuration includes: a slot offset $K_0$ of a PDSCH being 0, a start symbol S being 2, an allocation length being 5 (or 6), a resource mapping type being a type A, and a type A position of a DMRS being 2.

In one possible design, an index number of the second configuration is 5.

In one possible design, the third configuration includes: a slot offset $K_0$ of a PDSCH being 0, a start symbol S being 8, an allocation length being 5 (or 6), a resource mapping type being a type A, and a type A position of a DMRS being 2.

In one possible design, an index number of the third configuration is 13.

In one possible design, the third configuration is carried in the PDCCH of the RMSI corresponding to the SSB 1, and the third configuration is carried in the PDCCH of the RMSI corresponding to the SSB 3.

Figure 15:
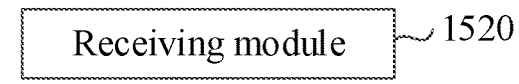
FIG. 15 is a block diagram of an apparatus for receiving a synchronization signal/PBCH block shown in one illustrative example.

FIG. 15 shows a block diagram of an apparatus for receiving a synchronization signal/PBCH block provided in one illustrative example of the present application. The apparatus may be implemented by means of software, hardware (a processor, a memory and a baseband chip), or a combination thereof to be all or part of a terminal. The apparatus includes:

a receiving module 1520 configured to receive an SSB and RMSI corresponding to the SSB, where the SSB and the RMSI corresponding to the SSB are one group of the SSB and the RMSI corresponding to the SSB of four SSBs and RMSI corresponding to the four SSBs respectively transmitted by a base station in two continuous slots.

In one possible design, the receiving module 1520 is configured to receive the SSB and the RMSI corresponding to the SSB on an unlicensed spectrum.

In one possible design, each of the slots includes 14 symbols, and the four SSBs include: an SSB 0, an SSB 1, an SSB 2 and an SSB 3; and the receiving module 1520 is configured to receive the SSB 0 in 2nd to 5th symbols of a 0th slot of the unlicensed spectrum;

receive the SSB 1 in 8th to 11th symbols of the 0th slot of the unlicensed spectrum;

receive the SSB 2 in 2nd to 5th symbols of a 1st slot of the unlicensed spectrum;

or receive the SSB 3 in 8th to 11th symbols of the 1st slot of the unlicensed spectrum.

In one possible design, the receiving module 1520 is configured to receive, according to a first configuration in the SSB 1 and in a 1st symbol of the 0th slot, a PDCCH of RMSI corresponding to the SSB 1;

or receive, according to a first configuration in the SSB 3 and in the 1st symbol of the 1st slot, a PDCCH of RMSI corresponding to the SSB 3.

In one possible design, the first configuration includes configuration information of a PDCCH common search space of a type 0, where the configuration information of the PDCCH common search space of the type 0 is as follows:

$$n_0 = (O*2_\mu + [i*M]) \bmod N_{slot}^{frame,\mu},$$

where M=½, O=0, μ is a subcarrier spacing, i is an index of the SSB, $n_0$ is an index of the slot, $N_{slot}^{frame,\mu}$ is the number of slot of each subframe of a subcarrier spacing configuration, and mod is a modulo operation.

In one possible design, the receiving module 1520 is configured to receive, according to a third configuration in the PDCCH of the RMSI corresponding to the SSB 1 and in 8th to B-th symbols of the 0th slot, a PDSCH of the RMSI corresponding to the SSB 1, or receive, according to a third configuration in the PDCCH of the RMSI corresponding to the SSB 3 and in 8th to B-th symbols of the 1st slot, a PDSCH of the RMSI corresponding to the SSB 3. B is 12 or 13.

In one possible design, the third configuration includes: a slot offset $K_0$ of a PDSCH being 0, a start symbol S being 8, an allocation length being 5 (or 6), a resource mapping type being a type A, and a type A position of a DMRS being 2.

In one possible design, an index number of the third configuration is 13.

Figure 16:
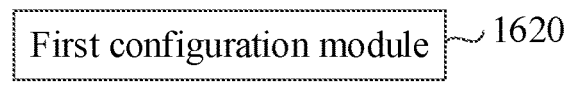
FIG. 16 is a block diagram of an apparatus for configuring a PDCCH of RMSI shown in one illustrative example.

FIG. 16 shows a block diagram of an apparatus for configuring a PDCCH of RMSI provided in one illustrative example of the present application. The apparatus includes:

a first configuration module 1620 configured to transmit an SSB 0 and an SSB 1 in one slot, where first configurations are carried in the SSB 0 and the SSB 1, and the first configuration is used for indicating that the PDCCH of the RMSI of the SSB 0 is searched in a 0th symbol of the slot, and/or indicating that the PDCCH of the RMSI of the SSB 1 is searched in a 1st symbol of the slot.

In one possible design, the first configuration includes configuration information of a PDCCH common search space of a type 0, where the configuration information of the PDCCH common search space of the type 0 is as follows:

$$n_0 = (O*2_\mu + [i*M]) \bmod N_{slot}^{frame,\mu},$$

where M=½, O=0, μ is a subcarrier spacing, i is an index of the SSB, $n_0$ is an index of the slot, $N_{slot}^{frame,\mu}$ is the number of slot of each subframe of a subcarrier spacing configuration, and mod is a modulo operation.

Figure 17:
FIG. 17 is a block diagram of an apparatus for configuring a PDCCH of RMSI shown in one illustrative example.

FIG. 17 shows a block diagram of an apparatus for configuring a PDCCH of RMSI provided in one illustrative example of the present application. The apparatus includes:

a first receiving module 1720 configured to receive an SSB 0 in one slot, where a first configuration is carried in the SSB 0, the first configuration is used for indicating that the PDCCH of the RMSI of the SSB 0 is searched in a 0th symbol of the slot, and the slot includes the SSB 0 and an SSB 1;

or receive the SSB 1 in one slot, where the first configuration is carried in the SSB 1, the first configuration is used for indicating that the PDCCH of the RMSI of the SSB 1 is searched in a 1st symbol of the slot, and the slot includes the SSB 0 and the SSB 1.

In one possible design, the first configuration includes configuration information of a PDCCH common search space of a type 0, where the configuration information of the PDCCH common search space of the type 0 is as follows:

$$n_0 = (O*2_\mu + [i*M]) \bmod N_{slot}^{frame,\mu},$$

where M=½, O=0, $\mu$ is a subcarrier spacing, i is an index of the SSB, $n_0$ is an index of the slot, $N_{slot}^{frame,\mu}$ is the number of slot of each subframe of a subcarrier spacing configuration, and mod is a modulo operation.

Figure 18:
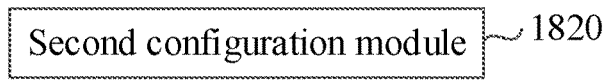
FIG. 18 is a block diagram of an apparatus for configuring a PDSCH of RMSI shown in one illustrative example.

FIG. 18 shows a block diagram of an apparatus for configuring a PDCCH of RMSI provided in one illustrative example of the present application. The apparatus includes:

a second configuration module 1820 configured to transmit a third configuration in the PDCCH of the RMSI of an SSB 1, where the third configuration is used for indicating that the PDSCH of the RMSI of the SSB 1 is received in 8th to B-th symbols of one slot, B is 12 or 13.

The SSB 1 is positioned at 8th to 11th symbols of the slot.

In one possible design, the third configuration includes:

a slot offset $K_0$ of a PDSCH being 0, a start symbol S being 8, an allocation length being 5 (or 6), a resource mapping type being a type A, and a type A position of a DMRS being 2.

In one possible design, an index number of the third configuration is 13.

Figure 19:
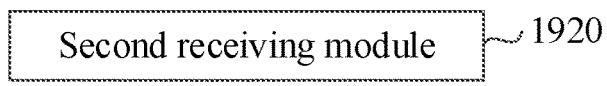
FIG. 19 is a block diagram of an apparatus for configuring a PDSCH of RMSI shown in one illustrative example.

FIG. 19 shows a block diagram of an apparatus for configuring a PDCCH of RMSI provided in one illustrative example of the present application. The apparatus includes:

a second receiving module 1920 configured to receive a third configuration in the PDCCH of the RMSI of an SSB 1, where the third configuration is used for indicating that the PDSCH of the RMSI of the SSB 1 is received in 8th to B-th symbols of one slot, and B is 12 or 13.

The SSB 1 is positioned at 8th to 11th symbols of the slot.

In one possible design, the third configuration includes:

a slot offset $K_0$ of a PDSCH being 0, a start symbol S being 8, an allocation length being 5 (or 6), a resource mapping type being a type A, and a type A position of a DMRS being 2.

In one possible design, an index number of the third configuration is 13.

It should be noted that the above receiving module may be realized by executing codes by a receiver, the above transmitting module may be realized by executing codes by a transmitter, and the above configuration module may be realized by executing codes by a processor.

Figure 20:
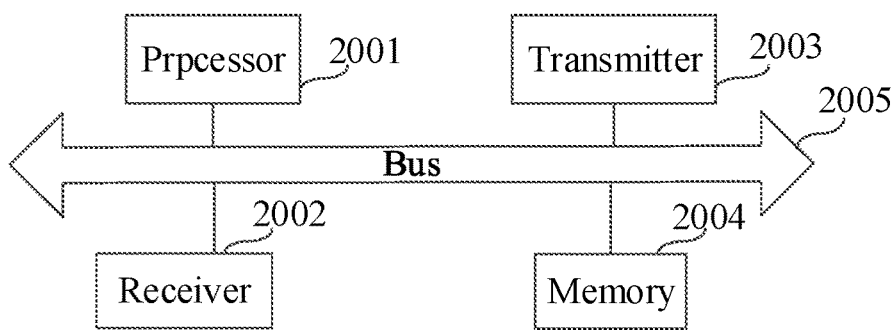
FIG. 20 is a structural schematic diagram of an access network device shown in one illustrative example.

FIG. 20 shows a structural schematic diagram of an access network device provided in one illustrative example of the present disclosure. The access network apparatus includes: a processor 2001, a receiver 2002, a transmitter 2003, a memory 2004 and a bus 2005.

The processor 2001 includes one or more processing cores, and executes software programs and modules, so as to run various function applications and process information.

The receiver 2002 and transmitter 2003 may be realized as a communication component, which may be a communication chip.

The memory 2004 is connected to the processor 2001 by means of the bus 2005.

The memory 2004 may be used to store at least one instruction, and the processor 2001 is used to execute the at least one instruction, so as to implement the various steps of the above method examples.

Furthermore, the memory 2004 may be realized by any type of volatile or non-volatile storage devices or combinations thereof, the volatile or non-volatile storage devices include but not limited to: magnetic disks or optical disks, electrically erasable programmable read-only memories (EEPROMs), erasable programmable read-only memories (EPROMs), static anytime access memories (SRAMs), read-only memories (ROMs), magnetic memories, flash memories and programmable read-only memory (PROMs).

An illustrative example provides a non-transitory computer-readable storage medium including an instruction, such as a memory including an instruction, and the instruction is executable by the processor of the access network device, so as to implement the above method. For example, the non-transitory computer-readable storage medium may be the ROMs, random access memories (RAMs), compact disc read-only memories (CD-ROMs), magnetic tapes, floppy disks, optical data storage devices, etc.

According to the non-transitory computer-readable storage medium, when the instruction in the non-transitory computer-readable storage medium is executed by the processor of the access network device, the access network device may implement the above method.

Figure 21:
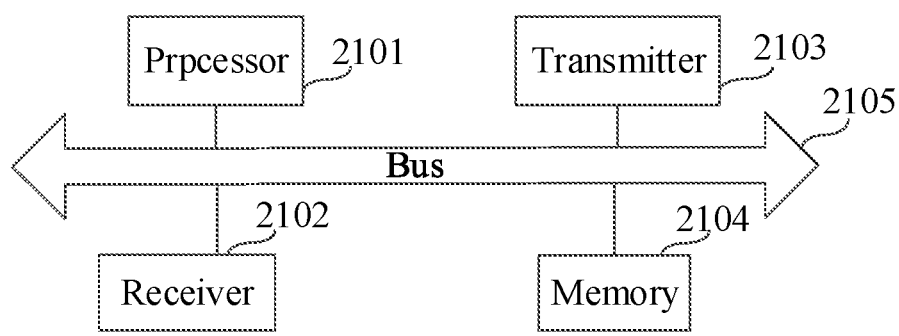
FIG. 21 is a structural schematic diagram of a terminal shown in one illustrative example.

FIG. 21 shows a structural schematic diagram of a terminal provided in one illustrative example of the present disclosure. The terminal includes: a processor 2101, a receiver 2102, a transmitter 2103, a memory 2104 and a bus 2105.

The processor 2101 includes one or more processing cores, and executes software programs and modules, so as to run various function applications and process information.

The receiver 2102 and transmitter 2103 may be realized as a communication component, which may be a communication chip.

The memory 2104 is connected to the processor 2101 by means of the bus 2105.

The memory 2104 may be used to store at least one instruction, and the processor 2101 is used to execute the at least one instruction, so as to implement the various steps of the above method examples.

Furthermore, the memory 2104 may be realized by any type of volatile or non-volatile storage devices or combinations thereof, the volatile or non-volatile storage devices include but not limited to: magnetic disks or optical disks, electrically erasable programmable read-only memories (EEPROMs), erasable programmable read-only memories (EPROMs), static anytime access memories (SRAMs), read-only memories (ROMs), magnetic memories, flash memories and programmable read-only memory (PROMs).

An illustrative example provides a non-transitory computer-readable storage medium including an instruction, such as a memory including an instruction, and the instruction is executable by the processor of the terminal, so as to implement the above method. For example, the non-transitory computer-readable storage medium may be the ROMs, random access memories (RAMs), compact disc read-only memories (CD-ROMs), magnetic tapes, floppy disks, optical data storage devices, etc.

According to the non-transitory computer-readable storage medium, when the instruction in the non-transitory computer-readable storage medium is executed by the processor of the terminal, the terminal may implement the above method.

One illustrative example of the present disclosure further provides a non-transitory computer-readable storage medium. The non-transitory computer-readable storage medium stores at least one instruction, at least one program, a code set or an instruction set, where the at least one instruction, the at least one program, the code set or the instruction set are loaded and executed by the processor, so as to implement the methods provided in the above various method examples.

One aspect of the present application provides the method for transmitting a synchronization signal/PBCH block. The method includes: transmitting, in two continuous slots, four SSBs and remaining minimum system information (RMSI) corresponding to the four SSBs respectively.

One aspect of the present application provides the method for receiving a synchronization signal/PBCH block. The method includes: receiving an SSB and RMSI corresponding to the SSB, where the SSB and the RMSI corresponding to the SSB are one group of the SSB and the RMSI corresponding to the SSB of four SSBs and RMSI corresponding to the four SSBs respectively transmitted by a base station in two continuous slots.

One aspect of the present application provides a method for configuring a physical downlink control channel (PDCCH) of RMSI. The method includes: transmitting an SSB 0 and an SSB 1 in one slot, where first configurations are carried in the SSB 0 and the SSB 1, and the first configuration is used for indicating that the PDCCH of the RMSI of the SSB 0 is searched in a 0th symbol of the slot, and/or indicating that the PDCCH of the RMSI of the SSB 1 is searched in a 1st symbol of the slot.

One aspect of the present application provides a method for configuring a PDCCH of RMSI. The method includes: receiving an SSB 0 in one slot, where a first configuration is carried in the SSB 0, the first configuration is used for indicating that the PDCCH of the RMSI of the SSB 0 is searched in a 0th symbol of the slot, and the slot includes the SSB 0 and an SSB 1; or receiving the SSB 1 in one slot, where the first configuration is carried in the SSB 1, the first configuration is used for indicating that the PDCCH of the RMSI of the SSB 1 is searched in a 1st symbol of the slot, and the slot includes the SSB 0 and the SSB 1.

One aspect of the present application provides a method for configuring a physical downlink shared channel (PDSCH) of RMSI. The method includes: receiving a third configuration in a PDCCH of the RMSI of an SSB 1, where the third configuration is used for indicating that the PDSCH of the RMSI of the SSB 1 is received in 8th to B-th symbols of one slot, B is 12 or 13, and the SSB 1 is positioned at 8th to 11th symbols of the slot.

One aspect of the present application provides the apparatus for transmitting a synchronization signal/PBCH block. The apparatus includes: a transmitting module configured to transmit, in two continuous slots, four SSBs and RMSI corresponding to the four SSBs respectively.

One aspect of the present application provides the apparatus for receiving a synchronization signal/PBCH block. The apparatus includes: a receiving module configured to receive an SSB and RMSI corresponding to the SSB, where the SSB and the RMSI corresponding to the SSB are one group of the SSB and the RMSI corresponding to the SSB of four SSBs and RMSI corresponding to the four SSBs respectively transmitted by a base station in two continuous slots.

One aspect of the present application provides the apparatus for configuring a PDCCH of RMSI. The apparatus includes: a first configuration module configured to transmit an SSB 0 and an SSB 1 in one slot, where first configurations are carried in the SSB 0 and the SSB 1, and the first configuration is used for indicating that the PDCCH of the RMSI of the SSB 0 is searched in a 0th symbol of the slot, and/or indicating that the PDCCH of the RMSI of the SSB 1 is searched in a 1st symbol of the slot.

One aspect of the present application provides the apparatus for configuring a PDCCH of RMSI. The apparatus includes: a first receiving module configured to receive an SSB 0 in one slot, where a first configuration is carried in the SSB 0, the first configuration is used for indicating that the PDCCH of the RMSI of the SSB 0 is searched in a 0th symbol of the slot, and the slot includes the SSB 0 and an SSB 1; or receive the SSB 1 in one slot, where the first configuration is carried in the SSB 1, the first configuration is used for indicating that the PDCCH of the RMSI of the SSB 1 is searched in a 1st symbol of the slot, and the slot includes the SSB 0 and the SSB 1.

One aspect of the present application provides the apparatus for configuring a PDSCH of RMSI. The apparatus includes: a second configuration module configured to transmit a third configuration in a PDCCH of the RMSI of an SSB 1, where the third configuration is used for indicating that the PDSCH of the RMSI of the SSB 1 is received in 8th to B-th symbols of one slot, B is 12 or 13, and the SSB 1 is positioned at 8th to 11th symbols of the slot.

One aspect of the present application provides the apparatus for configuring a PDSCH of RMSI. The apparatus includes: a second receiving module configured to receive a third configuration in a PDCCH of the RMSI of an SSB 1, where the third configuration is used for indicating that the PDSCH of the RMSI of the SSB 1 is received in 8th to B-th symbols of one slot, B is 12 or 13, and the SSB 1 is positioned at 8th to 11th symbols of the slot.

One aspect of the present application provides the access network device. The access network apparatus includes: a processor, and a memory storing an executable instruction, where the processor is configured to load and execute the executable instruction, so as to implement steps carried out by the base station in the above aspects.

One aspect of the present application provides a terminal. The terminal includes: a processor, and a memory storing an executable instruction, where the processor is configured to load and execute the executable instruction, so as to implement steps carried out by the terminal in the above methods.

One aspect of the present application provides the non-transitory computer-readable storage medium storing an executable instruction, where the executable instruction is loaded and executed by a processor, so as to implement the method for transmitting a synchronization signal/PBCH block in the above aspects, and/or the method for configuring a PDCCH of RMSI in the above aspects, and/or the method for configuring a PDSCH of RMSI in the above aspects.

It should be understood that "a plurality of" mentioned herein refers to two or more. The term "and/or", which is an association relation describing an associated object, means that there may be three relations. For example, an A and/or a B may represent three situations: there is the A alone, there are the A and the B at the same time, and there is the B alone. The character "/" generally indicates that association objects in the context are in an "or" relation.

Those skilled in the art could easily conceive of other implementation solutions of the present disclosure upon consideration of the description and the disclosure disclosed in the implementation. The present disclosure is intended to cover any variations, uses or adaptive changes of the present disclosure, which follow the general principles of the present disclosure and include common general knowledge or customary technical means, which is not disclosed in the present disclosure, in the art. The description and the examples are to be regarded as illustrative only, and the true scope and spirit of the present disclosure are indicated by the following claims.

It should be understood that the present disclosure is not limited to a precise structure which has been described above and illustrated in the accompanying drawings, and can have various modifications and changes without departing from the its scope. The scope of the present disclosure is limited by the appended claims only.

What is claimed is:

1. A method for transmitting a synchronization signal/PBCH block (SSB), comprising:
    carrying out listen before talk (LBT) on an unlicensed spectrum;
    transmitting in two continuous slots, in response to determining that the LBT is successful, four synchronization signal/PBCH blocks (SSBs) and remaining minimum system information (RMSI) corresponding to the four SSBs respectively;
    wherein each of the slots comprises 14 symbols, and the four SSBs comprise: an SSB 1 and an SSB 3; and
    transmitting in the two continuous slots, in response to determining that the LBT is successful, the RMSI corresponding to the four SSBs respectively comprises:
    transmitting, in a 1st symbol of the 0th slot, a PDCCH of RMSI corresponding to the SSB 1; and transmitting, in a 1st symbol of the 1st slot, a PDCCH of RMSI corresponding to the SSB 3.

2. The method according to claim 1, wherein each of the slots the four SSBs further comprise: an SSB 0 and an SSB 2; and
    transmitting in the two continuous slots, in response to determining that the LBT is successful, the four SSBs comprises at least one of following:
    carrying the SSB 0 in 2nd to 5th symbols of a 0th slot for transmitting;
    carrying the SSB 1 in 8th to 11th symbols of the 0th slot for transmitting;
    carrying the SSB 2 in 2nd to 5th symbols of a 1st slot for transmitting; or
    carrying the SSB 3 in 8th to 11th symbols of the 1st slot for transmitting.

3. The method according to claim 1, wherein the four SSBs further comprise: an SSB 0 and an SSB 2; and
    transmitting in the two continuous slots, in response to determining that the LBT is successful, the RMSI corresponding to the four SSBs respectively further comprises at least one of following:
    transmitting, according to a first configuration and in a 0th symbol of a 0th slot, a physical downlink control channel (PDCCH) of RMSI corresponding to the SSB 0; and
    transmitting, in a 0th symbol of a 1st slot, a PDCCH of RMSI corresponding to the SSB 2;
    transmitting, according to a second configuration and in 2nd to A-th symbols of the 0th slot, a physical downlink shared channel (PDSCH) of the RMSI corresponding to the SSB 0; and
    transmitting, in 2nd to A-th symbols of the 1st slot, a PDSCH of the RMSI corresponding to the SSB 2, wherein A is 6 or 7; or
    transmitting, according to a third configuration and in 8th to B-th symbols of the 0th slot, a PDSCH of the RMSI corresponding to the SSB 1; and transmitting, in 8th to B-th symbols of the 1st slot, a PDSCH of the RMSI corresponding to the SSB 3, wherein B is 12 or 13.

4. The method according to claim 3, wherein the first configuration comprises configuration information of a PDCCH common search space of a type 0, wherein the configuration information of the PDCCH common search space of the type 0 is as follows:

$n_0 = (O*2_\mu + [i*M]) \bmod N_{slot}^{frame,\mu}$, wherein $M=\frac{1}{2}$, $O=0$, u is a subcarrier spacing, i is an index of the SSB, no is an index of the slot, $N_{slot}^{frame,\mu}$ is the number of slot of each subframe of a subcarrier spacing configuration, and mod is a modulo operation.

5. The method according to claim 3, wherein the configuration information of the first configurations is carried in the SSB 1 and the SSB 3.

6. The method according to claim 3, wherein the second configuration comprises:
    a slot offset $K_0$ of the PDSCH being 0, a start symbol S being 2, an allocation length L being 5 or 6, a resource mapping type being a type A, and a type A position of a demodulation reference signal (DMRS) being 2.

7. The method according to claim 6, wherein an index number of the second configuration is 5.

8. The method according to claim 3, wherein the third configuration comprises:
    a slot offset $K_0$ of the PDSCH being 0, a start symbol S being 8, an allocation length being 5 or 6, a resource mapping type being a type A, and a type A position of a DMRS being 2.

9. The method according to claim 8, wherein an index number of the third configuration is 13.

10. The method according to claim 9, wherein
    the third configuration is carried in a PDCCH of RMSI corresponding to an SSB 1; and
    the third configuration is carried in a PDCCH of RMSI corresponding to an SSB 3.

11. A method for receiving a synchronization signal/PBCH block (SSB), comprising:
    receiving an SSB and RMSI corresponding to the SSB on an unlicensed spectrum,
    wherein the SSB and the RMSI corresponding to the SSB are one group of the SSB and the RMSI corresponding to the SSB of four SSBs and RMSI corresponding to the four SSBs respectively transmitted by a base station in two continuous slots; and
    wherein each of slots comprises 14 symbols, and four SSBs comprise: an SSB 0 and an SSB 3; and receiving RMSI corresponding to the SSB on the unlicensed spectrum comprises:
    receiving, according to a first configuration in the SSB 1 and in a 1st symbol of the 0th slot, a PDCCH of RMSI corresponding to the SSB 1; or receiving, according to a first configuration in the SSB 3 and in the 1st symbol of the 1st slot, a PDCCH of RMSI corresponding to the SSB 3.

12. The method according to claim 11, wherein each of slots comprises 14 symbols, and the four SSBs further comprise: an SSB 0, an SSB 1, and an SSB 2 and an SSB 3; and
    receiving the SSB on an unlicensed spectrum comprises:

receiving the SSB 0 in 2nd to 5th symbols of a 0th slot of the unlicensed spectrum;

receiving the SSB 1 in 8th to 11th symbols of the 0th slot of the unlicensed spectrum;

receiving the SSB 2 in 2nd to 5th symbols of a 1st slot of the unlicensed spectrum; or receiving the SSB 3 in 8th to 11th symbols of the 1st slot of the unlicensed spectrum.

13. The method according to claim 11, wherein the first configuration comprises configuration information of a PDCCH common search space of a type 0, wherein the configuration information of the PDCCH common search space of the type 0 is as follows:

$$n_0=(O*2_\mu+[i*M]) \bmod N_{slot}^{frame,\mu},$$

wherein M=½, O=0, u is a subcarrier spacing, i is an index of the SSB, no is an index of the slot, $N_{slot}^{frame,\mu}$ is the number of slot of each subframe of a subcarrier spacing configuration, and mod is a modulo operation.

14. The method according to claim 11, wherein receiving RMSI corresponding to the SSB on the unlicensed spectrum comprises:

receiving, according to a third configuration in the PDCCH of the RMSI corresponding to the SSB 1 and in 8th to B-th symbols of the 0th slot, a PDSCH of the RMSI corresponding to the SSB 1, wherein B is 12 or 13;

or receiving, according to a third configuration in the PDCCH of the RMSI corresponding to the SSB 3 and in 8th to B-th symbols of the 1st slot, a PDSCH of the RMSI corresponding to the SSB 3, wherein B is 12 or 13.

15. The method according to claim 14, wherein the third configuration comprises:

a slot offset $K_0$ of the PDSCH being 0, a start symbol S being 8, an allocation length L being 5 or 6, a resource mapping type being a type A, and a type A position of a DMRS being 2.

16. An access network device, comprising:

a processor, and a memory storing an executable instruction, wherein the processor is configured to:

carry out listen before talk (LBT) on an unlicensed spectrum;

transmit in two continuous slots, in response to determining that the LBT is successful, four synchronization signal/PBCH blocks (SSBs) and remaining minimum system information (RMSI) corresponding to the four SSBs respectively;

wherein each of the slots comprises 14 symbols, and the four SSBs comprise: an SSB 1 and an SSB 3; and the processor is further configured to:

transmit, in a 1st symbol of the 0th slot, a PDCCH of RMSI corresponding to the SSB 1;

and transmitting, in a 1st symbol of the 1st slot, a PDCCH of RMSI corresponding to the SSB 3.

17. A terminal, comprising:

a processor, and a memory storing an executable instruction, wherein the processor is configured to load and execute the executable instruction, so as to implement the method for transmitting a synchronization signal/PBCH block according to claim 11.

* * * * *